United States Patent
Shan

(10) Patent No.: US 7,836,111 B1
(45) Date of Patent: *Nov. 16, 2010

(54) DETECTING CHANGE IN DATA

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

This patent is subject to a terminal disclaimer.

(21) Appl. No.: 11/119,037

(22) Filed: Apr. 29, 2005

Related U.S. Application Data

(63) Continuation of application No. 11/047,283, filed on Jan. 31, 2005, now abandoned.

(51) Int. Cl.
*G06F 7/00* (2006.01)
*G06F 7/38* (2006.01)
*G06F 7/50* (2006.01)

(52) U.S. Cl. .................. 708/200; 708/491; 708/671

(58) Field of Classification Search ......... 708/422–426, 708/200, 491, 671
See application file for complete search history.

(56) References Cited

U.S. PATENT DOCUMENTS

| | | | |
|---|---|---|---|
| 5,218,299 A | 6/1993 | Dunkel | |
| 5,983,251 A | 11/1999 | Martens | |
| 6,132,969 A | 10/2000 | Stoughton | |
| 6,454,729 B1 | 9/2002 | Jacobs et al. | |
| 6,772,181 B1 | 8/2004 | Fu | |
| 6,985,779 B2 | 1/2006 | Hsiung et al. | |
| 7,047,089 B2 | 5/2006 | Martin et al. | |
| 7,076,474 B2 | 7/2006 | Jin et al. | |
| 7,308,385 B2* | 12/2007 | Wegerich et al. | 702/183 |
| 7,346,593 B2* | 3/2008 | Takeuchi et al. | 708/446 |
| 7,529,790 B1* | 5/2009 | Sayal | 708/422 |
| 7,587,330 B1 | 9/2009 | Shan | |
| 2003/0233273 A1 | 12/2003 | Jin et al. | |
| 2004/0015458 A1* | 1/2004 | Takeuchi et al. | 706/14 |
| 2005/0039086 A1* | 2/2005 | Krishnamurthy et al. | 714/57 |
| 2005/0069207 A1* | 3/2005 | Zakrzewski et al. | 382/190 |
| 2005/0143873 A1 | 6/2005 | Wilson | |
| 2005/0203360 A1 | 9/2005 | Brauker et al. | |
| 2006/0036403 A1* | 2/2006 | Wegerich et al. | 702/183 |
| 2006/0074817 A1 | 4/2006 | Shan et al. | |
| 2006/0167825 A1* | 7/2006 | Sayal | 706/45 |

OTHER PUBLICATIONS

Shan et al., U.S. Appl. No. 10/959,861, entitled "Methods and Systems for Cumulative Attribute Forecasting Using A PDF of a Current-To-Future Value Ratio," filed October 6, 2004, pp. 1-18, Figs. 1-6.
J. Shan, U.S. Appl. No. 11/047,231, entitled "Performing Quality Determination of Data," filed Jan. 31, 2005, pp. 1-32, Figs. 1-9.

(Continued)

*Primary Examiner*—Chat C Do

(57) ABSTRACT

To detect a change in data produced by a system, predicted data values for plural time points are computed. Actual data values for the plural time points are received, and residual values are derived from differences between the predicted data values and actual data values. Based on the computed residual values, a time point at which the change in data occurred is determined.

22 Claims, 4 Drawing Sheets

OTHER PUBLICATIONS

BEA WebLogic Server Capacity Planning Guide, Rel. 8.1, 54 pages Jun. 15, 2003.

J.Z. Shan, "Sequential Detection of Parameter Changes in Linear Dynamic Systems and Regression Models," pp. 1-75 (1995).

J. Shan, U.S. Appl. No. 11/047,283, entitled "Detecting Change in Data," filed Jan. 31, 2005, pp. 1-26, Figs. 1-6.

Shan et al., U.S. Appl. No. 10/322,201, entitled "Method and System for Predicting Revenue Based on Historical Pattern Identification and Modeling," filed Dec. 17, 2002, pp. 1-22, Figs. 1-8.

Shan et al., U.S. Appl. No. 10/355,353, entitled "Method and System for Constructing Prediction Interval Based on Historical Forecast Errors," filed Jan. 31, 2003, pp. 1-21, Figs. 1-6.

U.S. Appl. No. 11/117,989, Office Action dated Jan. 25, 2007, pp. 1-14.

U.S. Appl. No. 11/117,989, Office Action dated Jun. 6, 2007, pp. 1-14.

U.S. Appl. No. 11/117,989, Office Action dated Jan. 3, 2008, pp. 1-11.

J.Z. Shan, U.S. Appl. No. 11/117,989, entitled "Performing Quality Determination of Data," filed Apr. 29, 2005, pp. 1-32, Figs. 1-9.

U.S. Appl. No. 11/117,989, Final Rejection dated Jul. 9, 2008, pp. 1-10.

U.S. Appl. No. 11/117,989, Notice of Allowance dated Nov. 3, 2008 (6 pages).

Linear Regression—http:/www.stat.yale.edu/courses/1997-98/101/linreg. htm (pp. 1-4) (at least as early as Apr. 6, 2005).

J. Shan, U.S. Appl. No. 11/047,231, entitled "Performing Quality Determination of Data," filed Jan. 31, 2005, pp. 1-32, Figs. 1-6.

U.S. Appl. No. 11/118,832, Office Action dated Jun. 25, 2009, pp. 1-6 and attachments.

* cited by examiner

DETECTING CHANGE IN DATA

CROSS REFERENCE TO RELATED APPLICATION

This is a continuation of U.S. patent application Ser. No. 11/047,283, entitled "Detecting Change in Data," filed Jan. 31, 2005, which is hereby incorporated by reference. This is related to U.S. patent application Ser. No. 11/047,231, entitled "Performing Quality Determination of Data," filed Jan. 31, 2005 (U.S. Ser. No. 11/117,989, now U.S. Pat. No. 7,505,868, is a continuation of U.S. Ser. No. 11/047,231).

BACKGROUND

Companies or other organizations often gather data into data repositories, such as databases or data warehouses, for analysis to discover hidden data attributes, trends, patterns, or other characteristics. Such analysis is referred to as data mining, which is performed by companies or other organizations for planning purposes, for better understanding of customer behavior, or for other purposes.

It is often useful to detect for a "structural" or "systematic" change in observed data from a particular data source or database. A "systematic" or "structural" change in data results from some change in a particular system that produced the data, where such change results from an underlying change in the system rather than from changes due to normal operation of the system. The term "systematic change" is often used in the industry context, whereas the term "structural change" is often used in the economics context. In this description, the terms "systematic change" and "structural change" are interchangeably used and refer to any change in data that results from a change in the system that produced the data.

Detecting a systematic change of data involves change-point detection, which identifies the point in time of the change. Conventionally, change-point detection has employed a model that assumes a constant mean before the change, a constant mean of a possibly different value after the change, and a constant variance for the observed data values. A shift in the calculated constant means or constant variance has conventionally been used as an indication that a systematic change has occurred.

The assumption of constant means and constant variance is typically inapplicable to data that exhibits non-linear trends, seasonal effects, and heteroscedasticity (varying variability over time). Data exhibiting such characteristics are typically produced by systems that are dynamically changing or that exhibit non-linear changes due to varying underlying business cycles, business trends, or other factors. For data exhibiting non-linear trends, seasonal effects, and heteroscedasticity, change-point detection based on the calculation of constant means or constant variance would typically not provide accurate results.

DETAILED DESCRIPTION

Figure 1:
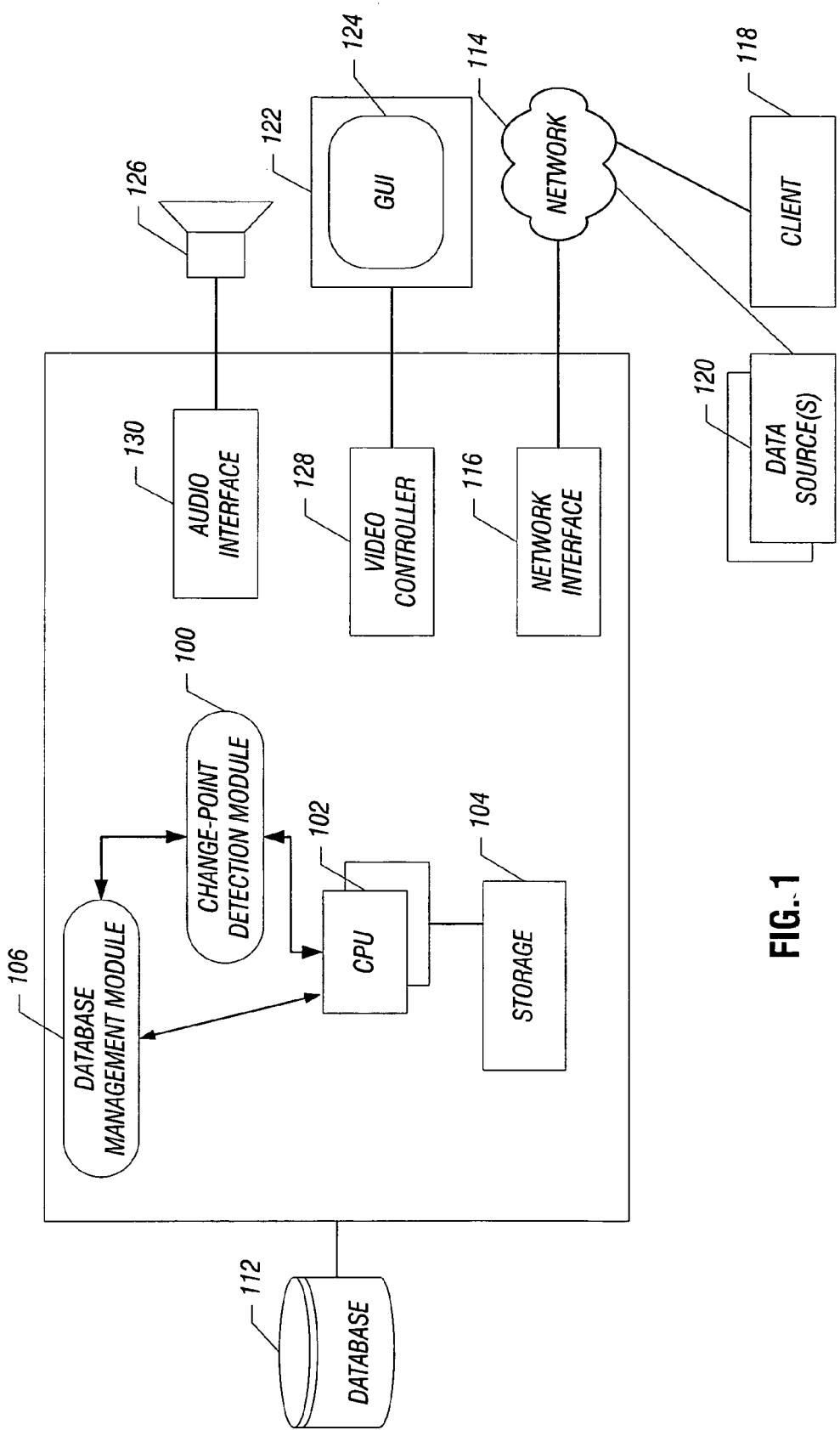
FIG. 1 is a block diagram of a system in which a change-point detection module according to an embodiment is executable.

FIG. 1 shows an example system that includes a change-point detection module 100 that is executable on one or plural central processing units (CPUs) 102 in a computer 110. The computer 110 can be a desktop computer, notebook computer, server computer, personal digital assistant (PDA), or other type of computing device. In some embodiments, the change-point detection module 100 is implemented in software. In other embodiments, the change-point detection module can be implemented in hardware, or in a combination of hardware and firmware.

The one or plural CPUs 102 are coupled to a storage 104 (which can include volatile memory, non-volatile memory, and/or a mass storage device). The computer 110 also includes a database management module 106 that is executable on the one or plural CPUs 102. Alternatively, the database management module 106 can be executable on a computer that is separate from the computer 110 on which the change-point detection module 100 is executed. The database management module 106 manages the access (read or write) of data stored in a database 112. The database 112 can be implemented in storage device(s) connected to the computer 110, or alternatively, the database 112 can be implemented in a server or other computer coupled over a data network, such as data network 114.

The computer 110 communicates over the data network 114 through a network interface 116. Example devices or systems that are coupled to the data network 114 include a client 118 and one or plural data sources 120. The data sources 120 (which can be associated with different organizations, departments within an organization, or other types of entities) are able to collect data that is then transmitted over the data network 114 and through the computer 110 for storing in the database 112.

The change-point detection module 100 checks for a systematic change in data stored in the database 112. Examples of data that can be stored in the database 112 include retail or wholesale sales data, invoice data, production volume data, inventory data, revenue data, financial data, cost data, quality control data, and other forms of data. In response to detecting a systematic change in data, the change-point detection module 100 is able to provide an alert (e.g., an alarm) to a user of a time point (also referred to as a "change point" or "change time") at which the systematic change in data occurred. Note that the change-point detection module 100 is also able to check for systematic changes in data of other databases aside from database 112.

As noted above, a "systematic change" or "structural change" in data results from some change in a particular system that produced the data, where the data change results from an underlying change in the system rather than from data change occurring as a result of normal operation of the system. The system producing the data is a dynamically changing system (or a system exhibiting non-linear behavior), which produces data that exhibits at least one of non-linear trends, seasonal effects, and heteroscedasticity (varying variability over time) under normal operating conditions. The normal changes that occur in data produced by a dynamically changing or non-linear system result from varying underlying business cycles, business trends, or other factors.

The term "systematic change" is often used in the industry context, whereas the term "structural change" is often used in the economics context. In this description, the terms "systematic change" and "structural change" are interchangeably used and refer to any change in data that results from a change in the system that produced the data.

In the ensuing description, the terms "dynamically changing system" or "non-linear system" are used interchangeably to refer to any system that produces data that exhibits non-linear trends, seasonal effects, and heteroscedasticity (varying variability over time) under normal operating conditions.

An underlying change in the dynamically changing or non-linear system that results in a systematic change in data produced by such system can occur due to changes in business environment (e.g., expansion into new markets, loss of market share, unexpected changes in cost structure, etc.) or due to errors or other un-planned anomalies. Errors that can cause a systematic change in the data can be related to an infrastructure error (such as hardware or software error), operator input error (such as due to input of incorrect input values), and so forth.

As described in further detail below, detection of a systematic change in an input data set according to some embodiments is based on first calculating predicted data values for future time periods and comparing the predicted data values to actual data values. The differences between the predicted data values and actual data values represent residuals, which are aggregated (e.g., summed) to produce aggregate values (e.g., sums) at discrete points in time. The aggregate values at the discrete points in time form a time series of aggregate values. The time series of aggregate values are then compared to threshold(s) to determine whether a systematic change, or plural systematic changes, have occurred in the input data set. Thus, according to some embodiments, detection of a systematic change in an input data set is based on aggregate values derived from the input data set.

In some implementations, the alert provided by the change-point detection module 100 is presented to a display monitor 122 (that is able to display a graphical user interface or GUI 124) or an audio output device 126 of the computer 110. Thus, the change-point detection module 100 is able to provide either a visual and/or audio alert to a user in response to a systematic change in data. The display monitor 122 is coupled to a video controller 128 in the computer 110, and the audio output device 126 is coupled to an audio interface 130 in the computer 110. Alternatively, the change-point detection module 100 is also able to communicate an alert of a systematic data change over the data network 114 to a remote computer, such as the client 118. The alert enables a user to act upon the systematic change in data. The alert can be in the form of a report or other indication.

Figure 2:
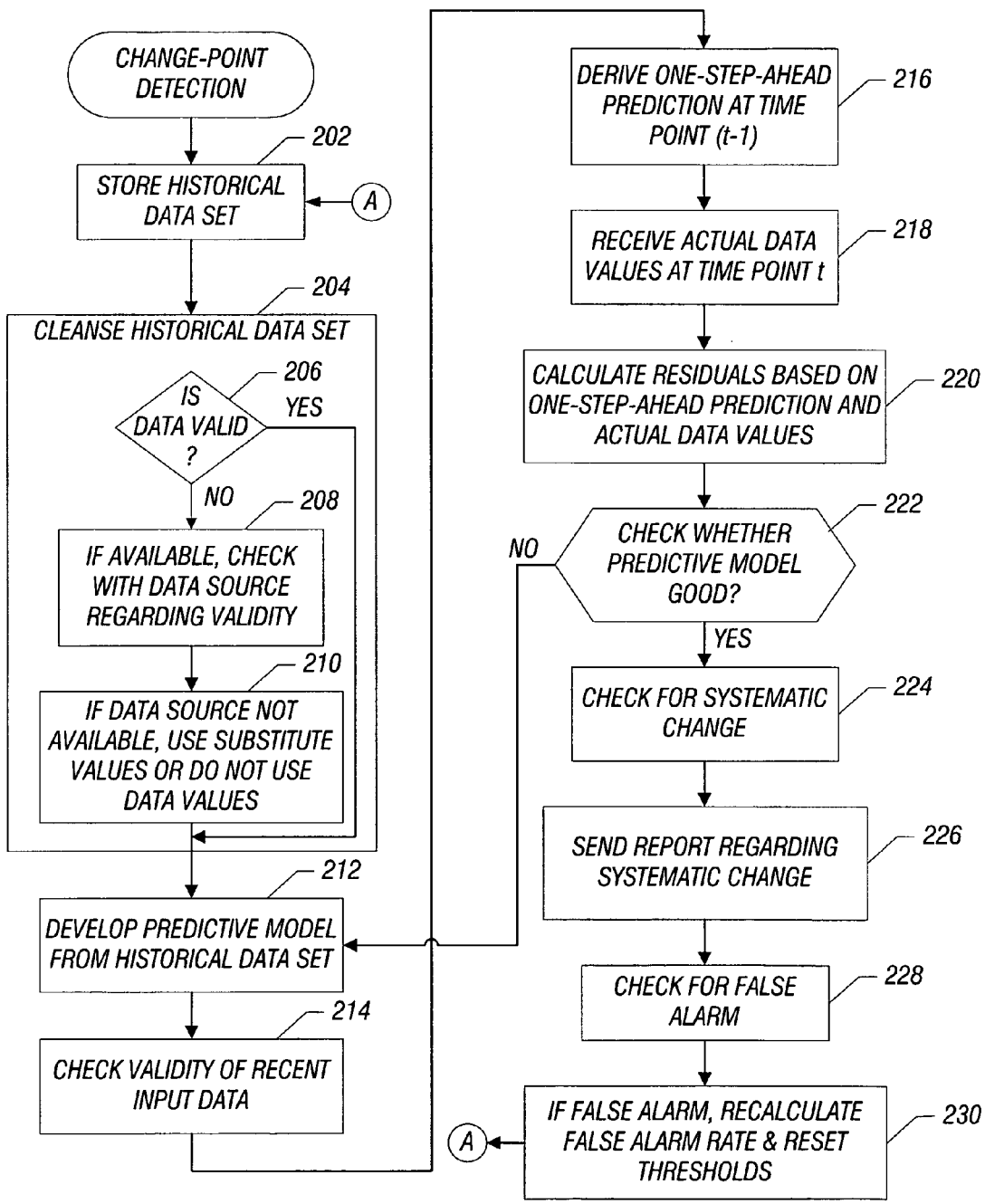
FIG. 2 is a flow diagram of a process performed by the change-point detection module of FIG. 1, in accordance with an embodiment.

A process performed by the change-point detection module 100, according to an embodiment, is depicted in FIG. 2. A historical data set is stored (at 202) by the change-point detection module 100. The historical data set refers to data collected over some predefined past time period. In one embodiment, the historical data set is in the form of a time series of data values (e.g., monthly sales data for each month of the predefined past time period). The historical data set can be stored in the database 112 or at some other storage location. As described further below, the stored historical data set is used to develop a predictive or forecasting model to predict data values for a future time period.

For better accuracy, the change-point detection module 100 optionally cleanses (at 204) the historical data set. Any inaccuracies or errors in the historical data set would lead to inaccurate results in the change-point detection process. To cleanse the historical data set, the change-point detection module determines (at 206) whether the historical data set is valid. This determination can be based on one of various traditional quality assurance techniques. One example of such a quality assurance technique is to compute a mean and standard deviation of data values in a time series. In one example, a three-sigma principle is used to decide whether the historical data set is valid. If the data values of the historical data set are outside the three-sigma range, then that indicates that the historical data set may contain an error.

If the data is detected to not be valid (at 206), the change-point detection module 100 checks (at 208) with the data source regarding the validity of the data values, if the data source is available. The data source can be contacted by sending an inquiry regarding data values for a particular time period. For example, the inquiry can be regarding whether monthly sales numbers for some time period match up with the monthly sales numbers maintained by the data source. The data source provides a response to the inquiry to indicate whether or not the data values for the particular time period are valid.

However, if the data source is not available, then the change-point detection module 100 performs (at 210) one of the following: (1) to not use the invalid data values (such as for a particular week, month, or other time period); or (2) replace the invalid data values with other data values, such as an overall mean value, an overall median value, a local neighborhood mean value, or a local neighborhood median value. An overall mean or median value refers to a value that is calculated based on the entire historical data set. A local neighborhood mean or median value refers to a value that is calculated based on a subset of the historical data set that is close in time to the invalid data values that are being replaced.

The cleansed historical data set is then stored. Based on the cleansed historical data set, the change-point detection module 100 develops (at 212) a predictive or forecasting model that is used for predicting a data value in a future time period. The terms "predictive model" and "forecasting model" are used interchangeably here. A predictive model can be created using various time series models, such as an autoregressive model, a moving average model, an autoregressive moving average model, an autoregressive integrated moving average (ARIMA) model, a seasonal ARIMA model, and Holt-Winters models. A time series model uses past data values to predict values for a future time period.

Variations of the time series modeling techniques are also described in the following U.S. patent applications: Ser. No. 10/322,201, entitled "Method and System for Predicting Revenue Based on Historical Pattern Identification and Modeling," filed Dec. 17, 2002; Ser. No. 10/355,353, entitled "Method and System for Constructing Prediction Interval Based on Historical Forecast Errors," filed Jan. 31, 2003, now U.S. Pat. No. 7,587,330; Ser. No. 10/959,861, entitled "Methods and Systems for Cumulative Attribute Forecasting Using a PDF of a Current-to-Future Value Ratio," filed Oct. 6, 2004 (U.S. Patent Publication No. 2006/0074817). Each of the variations described in the above cited applications can also be employed to generate a predictive model from the cleansed historical data set, according to some embodiments.

The validity of recent input data values is further checked (at 214) by the change-point detection module 100. For example, cleansing of the historical data set (at 204) may have been performed up through a certain time period, such as May. However, prior to forecasting for July, the change-point detection module 100 would first check the validity of recent data values for June. Thus, generally, validity of all prior un-checked data values is first performed prior to forecasting for a subsequent time period. If needed, the predictive model developed (at 212) can be refreshed if invalid data values have been replaced with valid data values by the checking task of 214.

The change-point detection module 100 next derives (at 216), at time point (t−1), a one-step-ahead prediction of data value (for a future time point t). The term "time point" can refer to a month, week, day, or any other time period. The one-step-ahead predicted data value is represented by $\hat{y}_t$.

Next, after time point t has passed, the change-point detection module 100 receives (at 218) the actual data value for time point t. The actual data value is represented by $y_t$. In one example, the data being analyzed is monthly sales data. Thus, in this example, to make a prediction of the monthly sales amount for July (time point t), the one-step-ahead predicted data value $\hat{y}_t$ is calculated in June (time point t−1). When July is over, the actual monthly sales value $y_t$ for July (time point t) is measured.

Instead of performing the one-step-ahead prediction, multi-step-ahead prediction can also be performed. For example, a two-step-ahead predicted data value $\hat{y}_t = \hat{y}_t(2)$ at time point (t−2) can be calculated, instead of the one-step-ahead predicted data value. More generally, an N-step-ahead predicted data value $\hat{y}_t = \hat{y}_t(N)$ can be calculated at time point (t−N), where N≧1. For uniqueness and potentially better prediction accuracy, the prediction that is derived with the most reliable past data points is used, with such prediction denoted by $\hat{y}_t$.

Note that multiple predicted data values $\hat{y}_i$ and actual data values $y_i$ (where i=1 to t) are stored by the change-point detection module for the input data set. The input data set includes the historical data set as well as recently received data values through time point t. Predicted data value $\hat{y}_i$ is the predicted data value for time point i calculated at a time point earlier than i, depending on how many steps ahead the prediction is made. Similarly, actual data value $y_i$ is the actual data value for time point i. Since the change-point detection process is an on-going process, the past predicted and actual data values are stored for use in later calculations when checking for a systematic change in data.

The multiple predicted data values $\hat{y}_i$ (i=1 to t) are represented as a set $\{\hat{y}_t\}$, which represents a time series of predicted data values starting at time point 1 and ending at time point t. Similarly, the multiple actual data values $y_i$ (i=1 to t) are represented as a set $\{y_t\}$.

Next, the change-point detection module 100 calculates (at 220) residual values $r_i$ based on the predicted data values $\hat{y}_i$ and actual data values $y_i$, according to the following equation:

$$r_i = \hat{y}_i - y_i \text{ (i=1 to t)} \quad \text{(Eq. 1)}$$

The residual values $r_i$ (i=1 to t) are represented as a time series of residual values $\{r_t\}$, with each residual value being the difference between the predicted data value $\hat{y}_i$ at a given time point and the actual data value $y_i$ at the given time point. As described further below, the residual values $r_i$ are used for detecting a change point or change time in the input data set, in accordance with some embodiments.

Based on the calculated residual values, the change-point detection module 100 can optionally check (at 222) whether the predictive model generated at 212 is "good" using a goodness-of-fit evaluation, such as a chi-square test or other goodness-of-fit evaluation. With a good predictive model developed at 212, unexplained remaining factors of the predictive model should be non-dominating and non-significant, and a central limit theorem would lead to a Gauss distribution with a zero mean for the aggregated effect. Based on the goodness-of-fit evaluation performed at 222, if the predictive model is determined not to be "good," then the goodness-of-fit result is provided as feedback to redevelop (at 212) the predictive model from the historical data set.

If the predictive model is determined to be good, then the change-point detection module 100 checks (at 224) for systematic change in the input data set. The details of this are described further below in connection with FIG. 3. In the check performed (at 224), the change-point detection module 100 also detects the change point (the point in time at which the systematic change occurred).

If a change point is detected, the change-point detection module 100 sends (at 226) a report (or other type of alert) regarding the systematic change to a predefined output device, such as the audio output device 126, the display monitor 122, or the remote client 118 (all shown in FIG. 1), based on user specification.

Next, the change-point detection module 100 checks (at 228) for a false alarm, such as by confirming with the data source (or some other source or entity) whether a change in fact occurred at the indicated change point. If a false alarm is detected, then a false alarm rate is recalculated (at 230), and thresholds for checking for the systematic change at 224 are reset. The recently received data values are provided for storage as part of the historical data set (at 202).

If a real systematic change is detected, then the new data values (data values after the change point) are used as the new historical data set (stored at 202), in place of the previous historical data set. The new historical data set is then used to develop (at 212) another predictive model for the purpose of determining another change point according to the process of FIG. 2. Prior to developing another predictive model based on the new historical data set, the process of FIG. 2 waits for arrival of other new data values until a large enough sample size is received.

Figure 3:
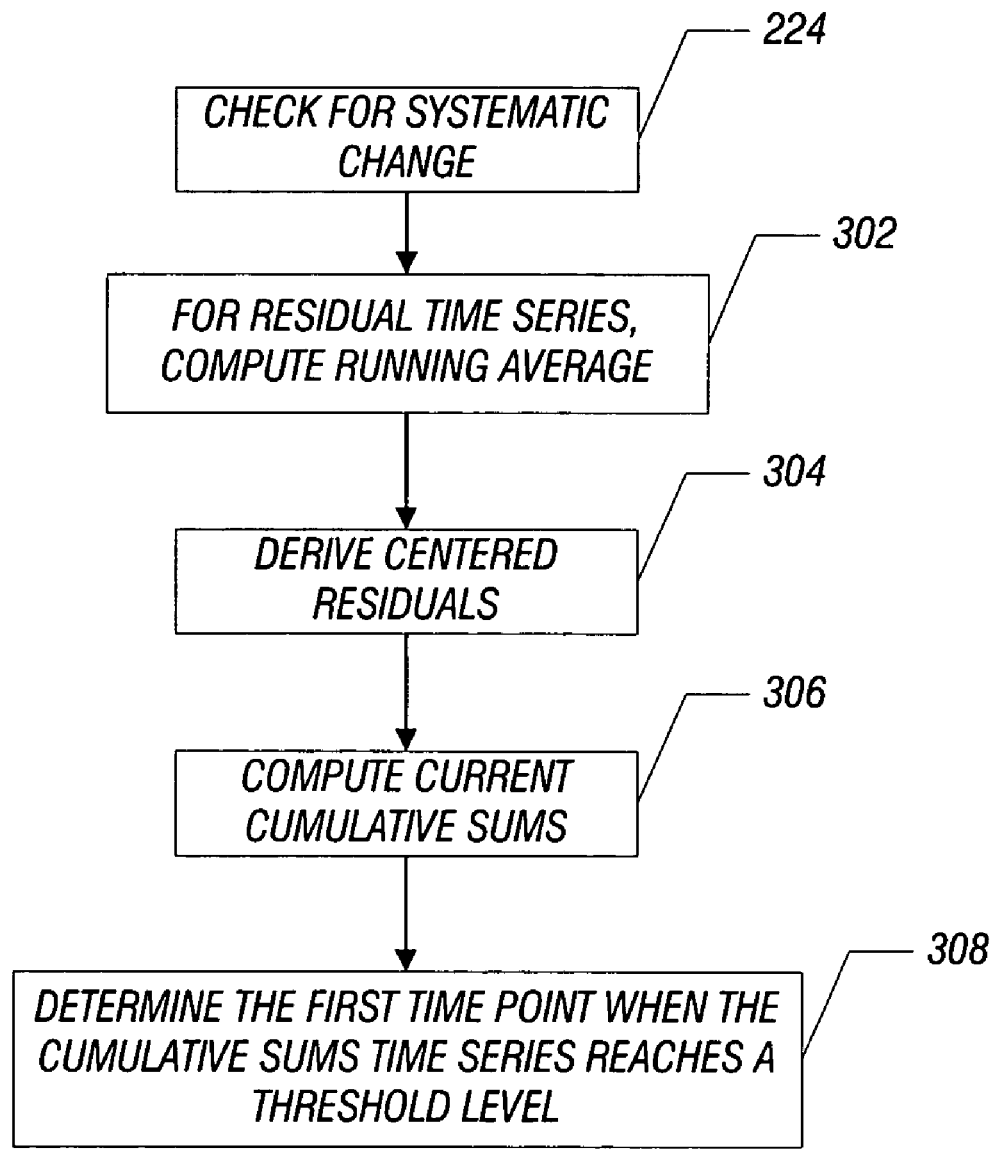
FIG. 3 is a flow diagram of a process to check for systematic change of data that is part of the flow of FIG. 2, in accordance with an embodiment.

FIG. 3 shows the tasks involved in checking for a systematic change (224 in FIG. 2). For the residual time series $\{r_t\}$, a running average $\bar{r}_t$ is computed (at 302). The running average is calculated according to the following equation:

$$\bar{r}_t = \sum_{i=1}^{t} r_i / t. \quad \text{(Eq. 2)}$$

Basically, the running average is the average of all the residual values (i=1 to t) for the input data set, starting from the first time point 1 through the current time point t. Next, a centered residual value $r_c(t)$ is calculated (at 304) according to the following equation:

$$r_c(t) = r_t - \bar{r}_t. \quad \text{(Eq. 3)}$$

The centered residual value $r_c(t)$ is basically the value of the actual residual value $r_i$ subtracted by the running average value $\bar{r}_t$.

Figure 4:
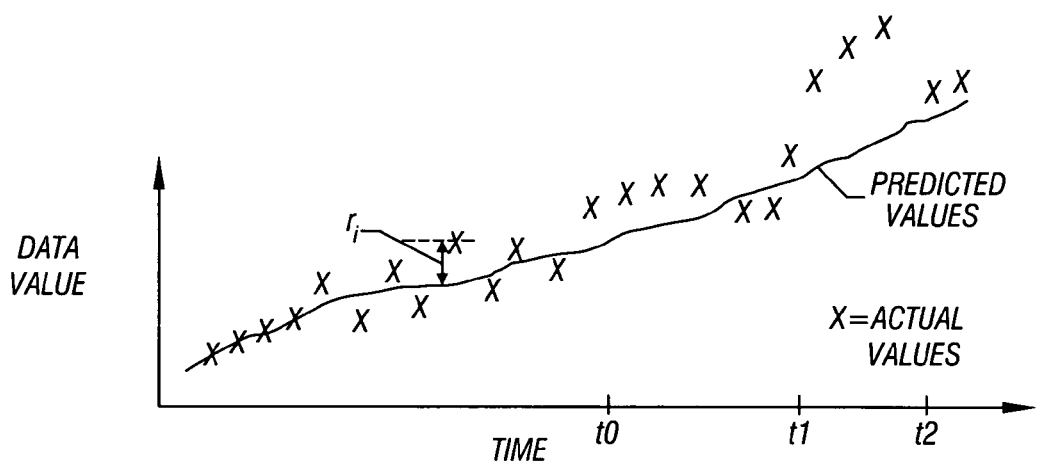
FIG. 4 is a graph showing a time series of data values, with the data values including predicted data values generated according to an embodiment and actual data values.
Figure 5:
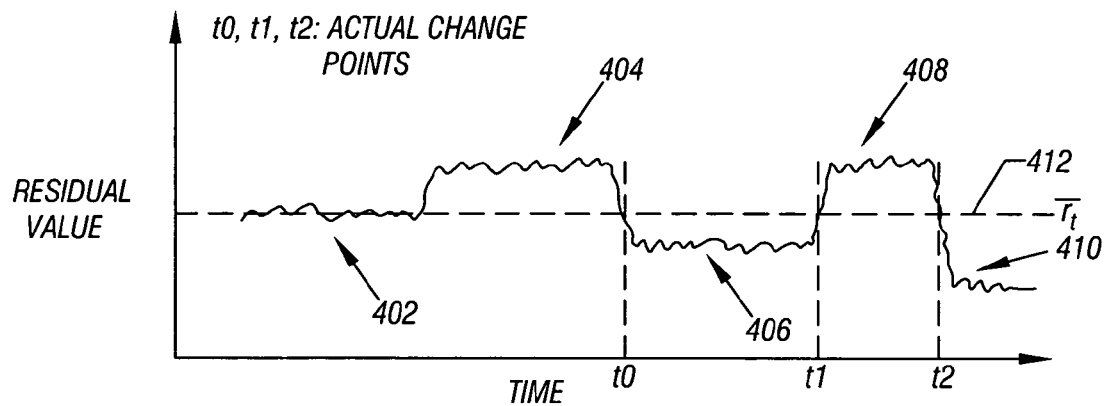
FIG. 5 is a graph showing a time series of residual values calculated from the predicted data values and actual data values of FIG. 4, in accordance with an embodiment.

The concept of residuals is depicted in FIGS. 4 and 5. FIG. 4 is a graph of a time series data values. The solid line in FIG. 4 represents predicted data values over time (calculated using the predictive model created by act 212 of FIG. 2), while the "x" marks actual values at discrete time points. The residual values $r_i$ are equal to the differences between the predicted values and actual values at respective discrete time points.

FIG. 5 is a graph of residual values over time. Time points $t_0, t_1, t_2$ represent change points (at which systematic changes have occurred in the input data set). Before time $t_0$, the residual values (indicated generally as 402 and 404) either have values close to (402) or above (404) the running average $\bar{r}_t$ represented by the dashed line 412. After the change point $t_0$, the residual values (represented generally as 406) have values less than the running average $\bar{r}_t$. After the change point $t_1$, the residual values (408) have values greater than the running average $\bar{r}_t$. After change point $t_2$, the residual values (410) have values less than the running average $\bar{r}_t$.

Based on the example of FIG. 5, the centered residual values $r_i(t)$ for $i<t_0$ have generally positive values, the centered residual values $r_i(t)$ for $t_0<i<t_1$ have generally negative values, the centered residual values $r_i(t)$ for $t_0<i<t_2$ have generally positive values, and the centered residual values $r_i(t)$ for $i>t_2$ have generally negative values.

Working with centered residual time series $\{r_i(t)\}$ provides for automatic bias correction, as observed by $$\sum_{i=1}^{t} r_i(t) = \sum_{i=1}^{t} \{r_i - \bar{r}_t\} = 0.$$

Note that if centered residual values are not used, the summation $$\sum_{i=1}^{t} r_i$$

does not necessarily equal zero. The predictive model generated (at 212) in FIG. 2 can have some built-in bias—the automatic bias correction provided by using centered residual values avoids having to perform some other calibration, which can be more complicated, to adjust for the built-in bias of the predictive model.

As further depicted in FIG. 3, after deriving the centered residual values at 304, the change-point detection module 100 computes (at 306) the current cumulative sum (CUSUM) values based on the centered residual values, according to the following formula:

$$C(s \mid t) = \sum_{i=1}^{s} r_i(t) = \sum_{i=1}^{s} \{r_i - \bar{r}_t\} \text{ for } s = 1, 2, \ldots, t, \quad \text{(Eq. 4)}$$

at each time point $t$.

The cumulative sums are one form of aggregation of the centered residual values.

Figure 6:
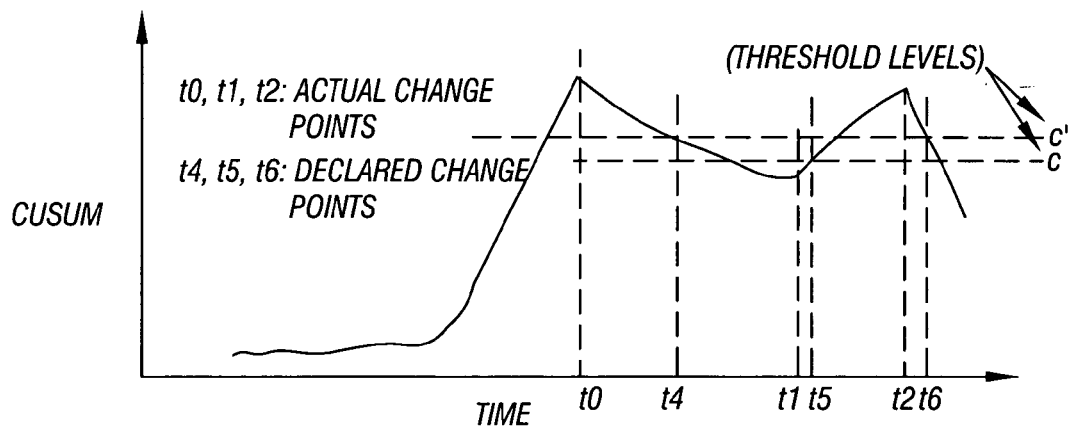
FIG. 6 is a graph showing a time series of cumulative sum values calculated from the residual values of FIG. 5, in accordance with an embodiment.

FIG. 6 is a graph that shows the cumulative sum values over time. Note that prior to change point $t_0$, the cumulative sum values have a positive slope, due to the fact that the centered residual values $r_i(t)$ prior to time $t_0$ is generally greater than the running average $\bar{r}_t$. However, after change point $t_0$ and before change point $t_1$, the cumulative sum values have a negative slope over time, since the residual values after time $t_0$ are generally less than the running average $\bar{r}_t$. Similarly, the cumulative sums after change point $t_1$, but before change point $t_2$ have a positive slope, and the cumulative sums after change point $t_2$ have a negative slope.

Calculating the cumulative sum values effectively magnifies any systematic change that may have occurred in the input data set. The magnification of the systematic change allows for easier and more accurate detection by the change-point detection module 100 of FIG. 1. Note that FIG. 6 shows cumulative sum values for one example of input data values. If there is no systematic change, the two CUSUM curve slopes separated by any point would be more or less a horizontal line.

As further shown in FIG. 3, the change-point detection module 100 determines (at 308) the first time point (referred to as the "declared change point") at which the cumulative sums time series changes direction (goes from a positive slope to a negative slope or vice versa) and reaches or crosses over a threshold level (depicted as c or c' in FIG. 6). This determination effectively includes a comparison of the cumulative sums against the threshold c or c'. In the example of FIG. 6, a first such time point is the first time point after the cumulative sums have changed directions (at time point $t_0$, which is the actual change point) from a positive slope to a negative slope, and at which the cumulative sums cross the threshold c' (which occurs at time point $t_4$, which is the declared change point).

In the on-going process of detecting for additional systematic changes, the change-point detection module next detects a change of direction in the cumulative sums at time point $t_1$ (actual change point), and cumulative sums crossing the threshold c at time point $t_5$ (declared change point). The change-point detection module next detects a change of direction in the cumulative sums at time point $t_2$ (actual change point), and the cumulative sums crossing the threshold c' at time point $t_6$ (declared change point).

The delays between time points $t_0$ and $t_4$, between time points $t_1$ and $t_5$, and between time points $t_2$ and $t_6$, are referred to as detection delays (a detection delay is the time between the actual change point $t_0$, $t_1$, or $t_2$ and the declared change points $t_4$, $t_5$ or $t_6$).

To adjust the detection delay, the threshold c or c' can be changed. Adjusting the threshold to increase or decrease its value can increase or reduce the detection delay. However, changing the threshold would likely cause a change in false alarms of systematic changes. Adjusting a threshold to reduce detection delay usually leads to an increased false alarm rate, and vice versa. A user can set the threshold c or c' according to system performance to achieve a balance between detection delay and false alarms.

The first time point (declared change point) at which the cumulative sums time series reaches a threshold level c or c' is defined according to the following formula:

$$s^* = \min\left\{s : C(s \mid t) = \sum_{i=1}^{s} r_i(t) \geq c\right\} \text{ or}$$

$$s^{**} = \min\left\{s : C(s \mid t) = \sum_{i=1}^{s} r_i(t) \leq c'\right\}.$$

In the equations above, $s^*$ represents the time point (declared change point) at which the cumulative sums cross over the threshold c, and $s^{**}$ represents the time point (declared change point) at which the cumulative sums cross under threshold c'.

A mechanism has been described to detect for systematic change in data produced by a dynamically changing or non-linear system. For enhanced accuracy, historical data set used for creating a predictive model is optionally cleansed to remove errors. Detection for systematic changes in data can be performed on an on-going basis by continually updating the predictive models using cleansed data as well as using a new historical data set whenever a systematic change has occurred. Also, automatic bias correction is performed by using centered residual values calculated based on predicted data values and actual data values.

The change-point detection module 100 of FIG. 1 can be implemented in software. Instructions of the software are stored on one or more storage devices in a system and loaded for execution on a processor (such as CPU(s) 102 in FIG. 1). The processor includes a microprocessor, microcontroller, processor module or subsystem (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (such as storage 104 in FIG. 1), which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of detecting a change in data produced by a system, comprising:
   computing, by a processor, predicted data values for plural time points;
   receiving, by the processor, actual data values for the plural time points;
   computing, by the processor, residual values derived from differences between the predicted data values and actual data values;
   calculating centered residual values that are derived from subtracting an aggregate value of the computed residual values from the computed residual values;
   determining, based on the centered residual values, a time point at which the change in data occurred, wherein the determining comprises:
      computing cumulative sums of the centered residual values, wherein the cumulative sums are at corresponding plural time points; and
      comparing the cumulative sums to at least one threshold to determine whether the change in data has occurred; and
   indicating that the change in data has occurred in response to at least one of the cumulative sums crossing the at least one threshold, wherein indicating the change in data comprises indicating a systematic change of data produced by a dynamically changing system that produces data exhibiting at least one of non-linear trends, seasonal effects, and heteroscedasticity.

2. The method of claim 1,
   wherein the centered residual values are derived from subtracting an average value of the computed residual values from the computed residual values.

3. The method of claim 1, further comprising:
   storing a historical data set of data values; and
   generating a predictive model based on the historical data set,
   wherein computing the predicted data values is based on the predictive model.

4. The method of claim 3, further comprising:
   cleansing the historical data set to remove errors in the historical data set,
   wherein generating the predictive model is based on the cleansed historical data set.

5. The method of claim 4, wherein cleansing the historical data set comprises:
   determining whether the system that produced the actual data values in the historical data set is available;
   in response to determining that the system is available, sending an inquiry to the system regarding a validity of data in the historical data set; and
   in response to determining that the system is not available, substituting selected data values in the historical data set with other data values.

6. The method of claim 1, wherein computing predicted data values for the plural time points comprises computing one-step-ahead predicted data values for the plural time points.

7. The method of claim 1, wherein computing predicted data values for the plural time points comprises computing N-step-ahead predicted data values for the plural time points, where $N \geq 2$.

8. An article comprising at least one machine-readable storage medium containing instructions that when executed cause a processor to:
   compute a time series of cumulative sums based on actual data values contained in an input data set, wherein computing the time series of cumulative sums comprises:
      computing predicted data values for plural time points;
      computing residual values derived from differences between the predicted data values and actual data values;
      calculating centered residual values that are derived from subtracting an aggregate value of the computed residual values from the computed residual values, wherein the cumulative sums are cumulative sums of the centered residual values;
   compare the cumulative sums in the time series against at least one threshold; and
   detect a change of the data values in the input data set in response to at least one of the cumulative sums crossing the at least one threshold, wherein detecting the change of the data values in the input data set comprises detecting a systematic change of data values produced by a dynamically changing system that produces data exhibiting at least one of non-linear trends, seasonal effects, and heteroscedasticity.

9. The article of claim 8, wherein the instructions when executed cause the processor to:
   generate a predictive model based on the input data set;
   wherein the predicted data values for plural time points are computed using the predictive model.

10. The article of claim 9, wherein the centered residual values are calculated by subtracting an average residual value from corresponding computed residual values.

11. The article of claim 10, wherein computing the cumulative sums of the centered residual values automatically compensates for a built-in bias of the predictive model.

12. The article of claim 8, wherein the instructions when executed cause the processor to:
provide an alert to a user in response to detecting the change.

13. The article of claim 8, wherein the instructions when executed cause the processor to:
determine if a false alarm has occurred in response to detecting the change.

14. The article of claim 13, wherein the instructions when executed cause the processor to:
in response to determining that a false alarm has occurred, resetting the at least one threshold to a different value.

15. A method comprising:
generating a predictive model based on an input data set produced by a system;
computing, by a processor, predicted data values for plural time points using the predictive model;
computing, by the processor, residual values based on the predicted data values and actual data values of the input data set;
calculating, by the processor, centered residual values by subtracting an average residual value from corresponding computed residual values;
computing, by the processor, a time series of cumulative sums of the centered residual values;
comparing, by the processor, the cumulative sums in the time series against at least one threshold; and
detecting a change of the data values in the input data set in response to at least one of the cumulative sums crossing the at least one threshold, wherein detecting the change of the data values in the input data set comprises detecting a systematic change of data values produced by a dynamically changing system that produces data exhibiting at least one of non-linear trends, seasonal effects, and heteroscedasticity.

16. The method of claim 15, wherein computing the cumulative sums of the centered residual values automatically compensates for a built-in bias of the predictive model.

17. The method of claim 15, further comprising:
determining if a false alarm has occurred in response to detecting the change; and
in response to determining that a false alarm has occurred, resetting the at least one threshold to a different value.

18. A system comprising:
a processor; and
a detection module executable on the processor to detect a change in data by:
calculating a time series of predicted data values;
receiving a time series of actual data values;
calculating residual values based on differences between the predicted data values and actual data values;
calculating centered residual values that are derived from subtracting an aggregate value of the calculated residual values from the calculated residual values;
determining, based on the centered residual values, occurrence of the change in data, wherein the detection module determines occurrence of the change in data by:
computing a time series of cumulative sums of the centered residual values, wherein the computed cumulative sums are at corresponding time points; and
comparing the cumulative sums to at least one threshold to determine whether the change in data has occurred; and
wherein the detection module is executable to indicate that the change in data has occurred in response to at least one of the cumulative sums crossing the at least one threshold, wherein indicating the change in data comprises indicating a systematic change of data produced by a dynamically changing system that produces data exhibiting at least one of non-linear trends, seasonal effects, and heteroscedasticity.

19. The system of claim 18, further comprising:
a storage to store a historical data set of data values,
wherein the detection module is executable to generate a predictive model based on the historical data set, and
wherein the detection module calculates the predicted data values by using the predictive model.

20. A method of detecting a change in an input data set produced by a system, comprising:
computing, by a processor, a time series of cumulative sums based on actual data values contained in the input data set produced by the system, wherein computing the time series of cumulative sums comprises:
computing predicted data values for plural time points;
computing residual values derived from differences between the predicted data values and actual data values;
calculating centered residual values that are derived from subtracting an aggregate value of the computed residual values from the computed residual values, wherein the cumulative sums are cumulative sums of the centered residual values;
comparing, by the processor, the cumulative sums in the time series against at least one threshold; and
detecting a change of the data values in the input data set in response to at least one of the cumulative sums crossing the at least one threshold, wherein detecting the change of the data values in the input data set comprises detecting a systematic change of data values produced by a dynamically changing system that produces data exhibiting at least one of non-linear trends, seasonal effects, and heteroscedasticity.

21. The method of claim 20, further comprising:
generating a predictive model based on the input data set;
wherein the predicted data values for plural time points are computed using the predictive model.

22. The method of claim 21, wherein the centered residual values are calculated by subtracting an average residual value from corresponding computed residual values.

* * * * *